United States Patent
Kwon et al.

(10) Patent No.: US 9,172,434 B2
(45) Date of Patent: Oct. 27, 2015

(54) COMMUNICATION SYSTEM USING WIRELESS POWER

(75) Inventors: Ui Kun Kwon, Hwaseong-si (KR); Sang Joon Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 423 days.

(21) Appl. No.: 13/490,751

(22) Filed: Jun. 7, 2012

(65) Prior Publication Data

US 2012/0328043 A1 Dec. 27, 2012

(30) Foreign Application Priority Data

Jun. 24, 2011 (KR) ........................ 10-2011-0061532

(51) Int. Cl.
*H04B 5/00* (2006.01)
*H02J 5/00* (2006.01)

(52) U.S. Cl.
CPC .............. *H04B 5/0031* (2013.01); *H02J 5/005* (2013.01); *H04B 5/0037* (2013.01); *H04B 5/0081* (2013.01); *Y02B 60/50* (2013.01)

(58) Field of Classification Search
CPC ... G06Q 30/04; G06Q 50/06; G01R 33/3628; H02J 5/005; H04L 1/0003; H04L 1/0071
USPC .......................................... 375/295; 455/41.1
See application file for complete search history.

(56) References Cited

U.S. PATENT DOCUMENTS

| | | | | |
|---|---|---|---|---|
| 4,558,442 A | * | 12/1985 | Yamada ........................ | 369/126 |
| 2006/0103457 A1 | | 5/2006 | Kumar et al. | |
| 2006/0132288 A1 | | 6/2006 | Hirai et al. | |
| 2010/0134256 A1 | | 6/2010 | Mihota | |
| 2010/0277121 A1 | | 11/2010 | Hall et al. | |
| 2011/0006824 A1 | * | 1/2011 | Kang et al. .................... | 327/175 |
| 2011/0184888 A1 | * | 7/2011 | Lee et al. ...................... | 705/412 |
| 2012/0049642 A1 | * | 3/2012 | Kim et al. ..................... | 307/104 |
| 2012/0146646 A1 | * | 6/2012 | Manipatruni et al. ........ | 324/322 |

FOREIGN PATENT DOCUMENTS

| | | |
|---|---|---|
| CN | 101188365 A | 5/2008 |
| CN | 101751585 A | 6/2010 |
| CN | 101820188 A | 9/2010 |
| KR | 10-2005-0105200 A | 11/2005 |
| KR | 10-0806724 B1 | 2/2008 |
| KR | 10-2010-0012944 A | 2/2010 |
| WO | WO 2009/105595 A2 | 8/2009 |

(Continued)

OTHER PUBLICATIONS

Chinese Office Action issed on Feb. 9, 2015 in counterpart Chinese Application No. 201210213034.X (27 pages, with English translation).

(Continued)

*Primary Examiner* — Leon-Viet Nguyen
(74) *Attorney, Agent, or Firm* — NSIP Law

(57) ABSTRACT

Provided are apparatuses, systems and methods for performing communication using wireless power. According to one general aspect, a communication device using wireless power may include: a controller configured to determine whether a mutual resonance occurs between a target resonator and a source resonator; and a modulator configured to modulate data based on whether the mutual resonance occurs.

26 Claims, 16 Drawing Sheets

(56) References Cited

FOREIGN PATENT DOCUMENTS

| WO | WO 2010/025157 A1 | 3/2010 |
| WO | WO 2011/063358 A2 | 5/2011 |

OTHER PUBLICATIONS

European Search Report issued on Jul. 15, 2015 in cournterpart European Patent Application No. 12172983.4 (7 pages, in English).

* cited by examiner

COMMUNICATION SYSTEM USING WIRELESS POWER

CROSS-REFERENCE TO RELATED APPLICATION(S)

This application claims the benefit under 35 U.S.C. §119 (a) of Korean Patent Application No. 10-2011-0061532, filed on Jun. 24, 2011, in the Korean Intellectual Property Office, the entire disclosure of which is incorporated herein by reference for all purposes.

BACKGROUND

1. Field

The following description relates to communication using wireless power.

2. Description of Related Art

Research into wireless power transmission has been conducted to address the limited capacity of conventional batteries, and the inconvenience of wired power supply of various devices including portable devices, and the like. The research is mainly focused on near-field wireless power transmission. Near-field wireless power transmission refers to a case in which a distance between transmission and reception coils is sufficiently short when compared to a wavelength at an operating frequency. A wireless power transmission and reception system using a resonance characteristic may include a source for providing power and a target for receiving power. In a process of transmitting and receiving wireless power, the source and the target may share control information.

SUMMARY

According to one general aspect, a communication device using wireless power may include: a controller configured to determine whether a mutual resonance occurs between a target resonator and a source resonator; and a modulator configured to modulate data based on whether the mutual resonance occurs.

The communication device may further include: a charger configured to charge an inductor and a capacitor using power through the mutual resonance; a power delivering unit configured to deliver power stored in the capacitor to a load; and a switch controller configured to control a switch that connects the capacitor to the charger or to the power delivering unit based on a determination of the controller, wherein the target resonator includes the inductor and the capacitor.

The switch controller may control the switch to connect the capacitor to the charger so as to generate the mutual resonance.

The communication device may further include: a charger configured to charge an inductor and a capacitor using power through the mutual resonance; a power delivering unit configured to deliver power stored in the inductor and the capacitor to a load; and a switch controller configured to control a switch that connects the capacitor to the power delivering unit based on a determination of the controller, wherein the target resonator includes the inductor and the capacitor.

The controller may change a resonant frequency of the target resonator, and then capture power stored in the target resonator within a predetermined period of time.

The communication device may further include: a demodulator configured to demodulate data based on the amount of power stored in the target resonator in response to a termination of the mutual resonance.

The controller may control a timing of the mutual resonance occurring between the source resonator and the target resonator.

The communication device may further include: an envelope detector configured to detect an envelope in a waveform of current or voltage applied to the target resonator.

The envelope detector may acquire the envelope from an output of an analog circuit for detecting an envelope in response to an input of the current or the voltage.

The envelope detector may include: a down conversion unit configured to generate a down-converted signal by multiplying one of predetermined signal waveforms of a resonant frequency by a signal that is analog-digital conversion (ADC) sampled from the current or the voltage; a transformer configured to transform the down-converted signal into a frequency domain signal using the discrete Fourier transform (DFT) or the fast Fourier transform (FFT); a filtering unit configured to generate a signal from which a harmonic component is removed by applying low-pass filtering to the frequency domain signal; and an inverse transformer configured to transform the signal from which a harmonic component is removed into a time domain signal using the inverse DFT or the inverse FFT.

The envelope detector may include: a transformer configured to transform a signal that is ADC sampled from the current or the voltage into a frequency domain signal using the DFT or the FFT; a circular shifter configured to perform a circular shift of the frequency domain signal by a predetermined frequency; a filtering unit configured to generate a signal from which a harmonic component is removed by applying low-pass filtering to the circular-shifted signal; and an inverse transformer configured to transform the signal from which a harmonic component is removed into a time domain signal using the inverse DFT or the inverse FFT.

The envelope detector may include: a down conversion unit configured to generate a down-converted signal by multiplying one of predetermined signal waveforms of a resonant frequency by a signal that is ADC sampled from the current or the voltage; and a filtering unit configured to generate a signal from which a harmonic component is removed by applying low-pass filtering to the down-converted signal using convolution in a time domain.

According to another general aspect, a communication device using wireless power may include: a receiver configured to receive data from a target resonator through a mutual resonance between a source resonator and the target resonator; and a demodulator configured to demodulate the data based on an amount of power stored in the source resonator.

The communication device may further include: a power charger configured to charge the source resonator using power provided from a power supply device; and a modulator configured to control an amount of power stored in the source resonator, and modulate data based on the amount of power.

The communication device may further include: a controller configured to control a charging time of the source resonator.

The demodulator may demodulate the data by comparing an amount of power stored in the source resonator when a mutual resonance occurs between the source resonator and the target resonator with an amount of power stored in the source resonator when a mutual resonance does not occur between the source resonator and the target resonator.

The demodulator may demodulate the data based on whether a mutual resonance occurs between the source resonator and the target resonator.

The communication device may further include: an envelope detector configured to detect an envelope in a waveform of current or voltage applied to the source resonator.

The demodulator may determine whether a mutual resonance occurs between the source resonator and the target resonator by comparing the detected envelope with a predetermined value, and demodulate the data based on whether the mutual resonance occurs.

The envelope detector may acquire the envelope from an output of an analog circuit for detecting an envelope in response to an input of the current or the voltage.

The envelope detector may include: a down conversion unit configured to generate a down-converted signal by multiplying one of predetermined signal waveforms of a resonant frequency by a signal that is analog-digital conversion (ADC) sampled from the current or the voltage; a transformer configured to transform the down-converted signal into a frequency domain signal using the discrete Fourier transform (DFT) or the fast Fourier transform (FFT); a filtering unit configured to generate a signal from which a harmonic component is removed by applying low-pass filtering to the frequency domain signal; and an inverse transformer configured to transform the signal from which a harmonic component is removed into a time domain signal using the inverse DFT or the inverse FFT.

The envelope detector may include: a transformer configured to transform a signal that is ADC sampled from the current or the voltage into a frequency domain signal using the DFT or the FFT; a circular shifter configured to perform a circular shift of the frequency domain signal by a predetermined frequency; a filtering unit configured to generate a signal from which a harmonic component is removed by applying low-pass filtering to the circular-shifted signal; and an inverse transformer configured to transform the signal from which a harmonic component is removed into a time domain signal using the inverse DFT or the inverse FFT.

The envelope detector may include: a down conversion unit configured to generate a down-converted signal by multiplying one of predetermined signal waveforms of a resonant frequency by a signal that is ADC sampled from the current or the voltage; and a filtering unit configured to generate a signal from which a harmonic component is removed by applying low-pass filtering to the down-converted signal using convolution in a time domain.

According to yet another general aspect, a communication system using wireless power may include: a controller configured to determine whether a mutual resonance occurs between a target resonator and a source resonator; a modulator configured to modulate data based on whether the mutual resonance occurs; a receiver configured to receive data from the target resonator through a mutual resonance between the source resonator and the target resonator; and a demodulator configured to demodulate the data based on an amount of power stored in the source resonator.

According to still another general aspect, a communication method using wireless power may include: determining whether a mutual resonance occurs between a target resonator and a source resonator; and modulating data based on whether the mutual resonance occurs.

According to a further general aspect, a communication method using wireless power may include: receiving data from a target resonator through a mutual resonance between a source resonator and the target resonator; and demodulating the data based on an amount of power stored in the source resonator.

Other features and aspects will be apparent from the following detailed description, the drawings, and the claims.

Figure 1:
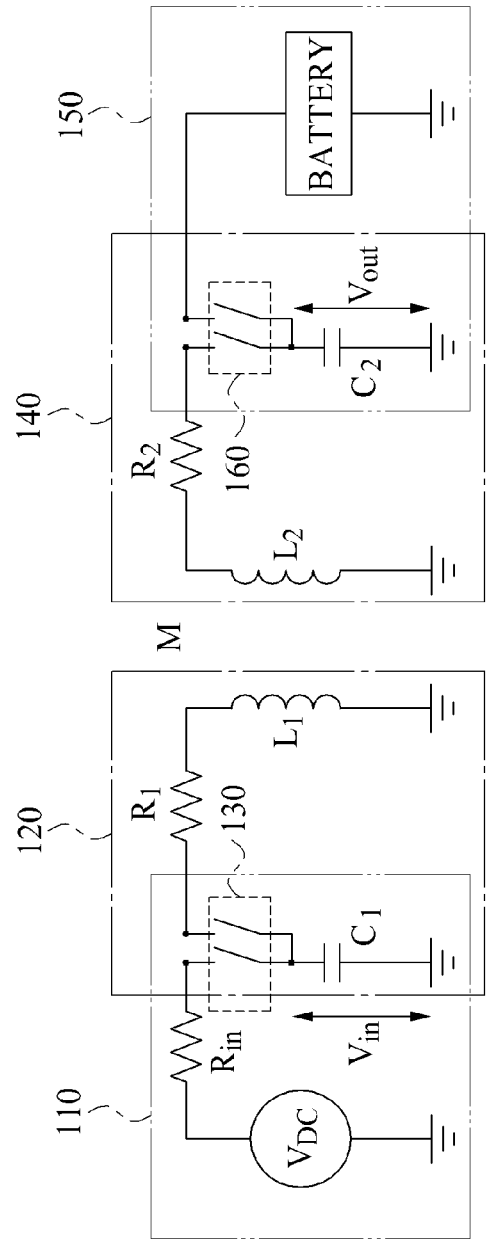
FIG. 1 is a diagram illustrating an equivalent circuit of a communication system using wireless power in which a power input unit and a power transmission unit are physically isolated by a capacitor and a switch unit, and a receiver and a power output unit are physically isolated by another capacitor and another switch unit.

Throughout the drawings and the detailed description, unless otherwise described, the same drawing reference numerals will be understood to refer to the same elements, features, and structures. The relative sizes and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing steps and/or operations described is an example; however, the sequence of and/or operations are not limited to those set forth herein and may be changed as is known in the art, with the exception of steps and/or operations necessarily occurring in a certain order. Also, description of well-known functions and constructions may be omitted for increased clarity and conciseness.

A communication system using wireless power according to an aspect may be applied to various systems using a wireless power transmission. For instance, the communication system may be used for exchanging control information and other types of information between a transmission end and a reception end in a system using a wireless power transmission such as a cell phone, a wireless television (TV), and the like. In addition, the communication system may be applied to a bio-healthcare field and thus, may be used for remotely transmitting power to a device inserted into a body, or for wirelessly transmitting power to a bandage-type device for measuring a heartbeat.

A communication system using wireless power according to another aspect may be applied to a remote control of an information storage device excluding a power source. The communication system may be applied to a system for remotely providing power for driving a device to the information storage device, and for wirelessly loading information stored in the information storage device.

The communication system using wireless power may generate a signal by storing energy from a power supply device in a source resonator, and turning off a switch that electrically connects the power supply device and the source resonator, thereby inducing self-resonance of the source resonator. When a target resonator having the same resonant frequency as a resonant frequency of a self-resonating source resonator is sufficiently near to the source resonator to couple with the source resonator, a mutual resonance may occur between the source resonator and the target resonator. The source resonator may refer to a resonator provided with energy from a power supply device, and the target resonator may refer to a resonator receiving energy delivered through a mutual resonance.

FIG. 1 illustrates an equivalent circuit of a communication system using wireless power in which a power input unit 110 and a power transmission unit 120 are physically isolated by a capacitor $C_1$ and a switch unit 130, and a receiver 140 and a power output unit 150 are physically isolated by a capacitor $C_2$ and a switch unit 160.

Referring to FIG. 1, the communication system using wireless power may correspond to a source-target configuration having a source and a target. The communication system using wireless power may include a wireless power transmission device corresponding to a source and a wireless power reception device corresponding to a target.

The wireless power transmission device may include the power input unit 110, the power transmission unit 120, and the switch unit 130. The power input unit 110 may store energy in the capacitor $C_1$ using a power supply device. The switch unit 130 may connect the capacitor $C_1$ to the power input unit 110 while energy is stored in the capacitor $C_1$, and may disconnect the capacitor $C_1$ from the power input unit 110 so that the capacitor $C_1$ may be connected to the power transmission unit 120 while energy stored in the capacitor $C_1$ is discharged. Thus, the switch unit 130 may prevent the capacitor $C_1$ from being simultaneously connected to the power input unit 110 and the power transmission unit 120.

The power transmission unit 120 may transfer electromagnetic energy to the receiver 140. A transmission coil $L_1$ of the power transmission unit 120 may transfer power through a mutual resonance with a reception coil $L_2$ of the receiver 140. The level of the mutual resonance occurring between the transmission coil $L_1$ and reception coil $L_2$ may be affected by a mutual inductance M.

The power input unit 110 may include an input voltage $V_{DC}$, an internal resistance $R_{in}$, and a capacitor $C_1$, the power transmission unit 120 may include basic circuit elements $R_1$, $L_1$, and $C_1$ which reflect a physical property corresponding to the power transmission unit 120, and the switch unit 130 may include one or more switches. An active device may be used as a switch to perform an ON and OFF function. As will be appreciated, R denotes a resistance component, L denotes an inductor component, and C denotes a capacitance component. Voltage across the capacitor $C_1$ corresponding to a portion of the input voltage $V_{DC}$ may be indicated by $V_{in}$.

The wireless power reception device may include the receiver 140, the power output unit 150, and the switch unit 160. The receiver 140 may receive electromagnetic energy from the power transmission unit 120. The receiver 140 may store received electromagnetic energy in a connected capacitor. The switch unit 160 may connect the capacitor $C_2$ to the receiver 140 while energy is stored in the capacitor $C_2$, and may disconnect the capacitor $C_2$ from the receiver 140 so that the capacitor $C_2$ may be connected to the power output unit 150 while energy stored in the capacitor $C_2$ is delivered to a load. The switch unit 160 may prevent the capacitor $C_2$ from being simultaneously connected to the receiver 140 and the power output unit 150.

A reception coil $L_2$ of the receiver 140 may receive power through a mutual resonance with the transmission coil $L_1$ of the power transmission unit 120. Using the received power, the capacitor $C_2$ connected to the reception coil $L_2$ may be charged. As shown, the power output unit 150 may deliver the power charged in the capacitor $C_2$ to a battery. Alternatively, the power output unit 150 may deliver power to a load or a target device instead of the battery.

The receiver 140 may include circuit elements $R_2$, $L_2$, and $C_2$ by reflecting a physical property corresponding to the receiver 140, the power output unit 150 may include the capacitor $C_2$ and the battery, and the switch unit 160 may include one or more switches. The voltage across the capacitor $C_2$ corresponding to a portion of the energy received by the reception coil $L_2$ may be indicated by $V_{out}$.

As described in the foregoing, a resonator isolation (RI) system for transmitting power by physically isolating the power input unit 110 and the power transmission unit 120, and the receiver 140 and the power output unit 150 may be advantageous especially when compared to a conventional scheme using an impedance matching. In some instances, a power amplifier may not be used since power may be supplied directly from a direct current (DC) source to a source resonator. And, in some instances, rectification through a rectifier may not be used since energy is captured from power stored in a capacitor at a reception end. Transmission efficiency may not be responsive to a change in the distance between a transmission end and a reception end since impedance matching may not be used. The RI system may be easily extended to a communication system that uses wireless power and includes a plurality of transmission ends and a plurality of reception ends.

Figure 2:
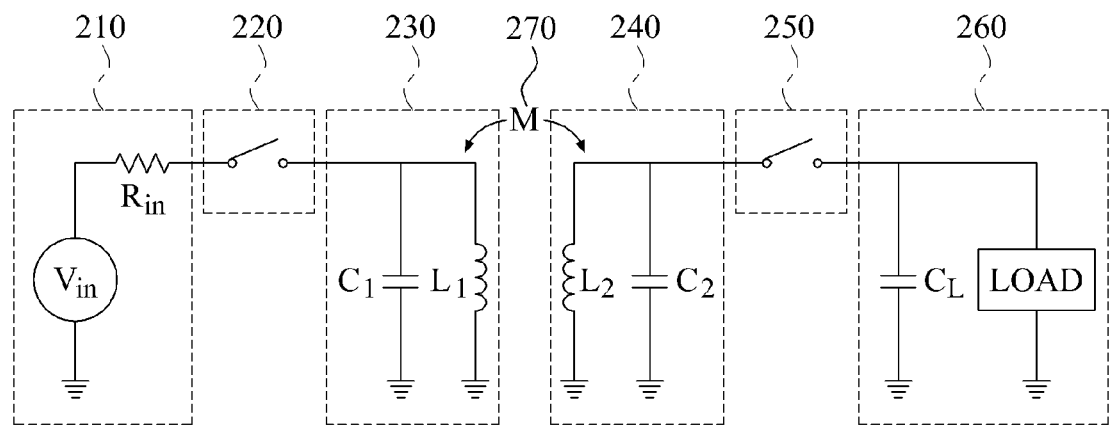
FIG. 2 is a diagram illustrating an equivalent circuit of a communication system using wireless power in which a power charger and a transmitter are physically isolated by a switch, and a charger and a power output unit are physically isolated by another switch.

FIG. 2 illustrates an equivalent circuit of a communication system using wireless power in which a power charger 210 and a transmitter 230 are physically isolated by a switch, and a charger 240 and a power output unit 260 are physically isolated by another switch.

Referring to FIG. 2, the communication system using wireless power may correspond to a source-target configuration having a source and a target. The communication system using wireless power may include a wireless power transmission device corresponding to a source and a wireless power reception device corresponding to a target.

The wireless power transmission device may include the power charger 210, a controller 220, and the transmitter 230. The power charger 210 may include a power supply device $V_{in}$ and a resistor $R_{in}$. A source resonator may include a capacitor $C_1$ and an inductor $L_1$. The transmitter 230 may transmit energy stored in the source resonator through a mutual resonance between the source resonator and a target resonator. The controller 220 may be configured to turn the switch ON to provide power from the power charger 210 to the source resonator. The power supply device $V_{in}$ may apply a voltage to the capacitor $C_1$, and may apply a current to the inductor $L_1$. In response to the wireless power transmission device reaching a steady state, a voltage applied to the capacitor $C_1$ may become "0," and a current flowing through the inductor $L_1$ may have a value of $V_{in}/R_{in}$. At the steady state, the inductor $L_1$ may be charged through the applied current.

The controller 220 may turn the switch OFF when power stored in the source resonator reaches a predetermined value at the steady state. Information of the predetermined value may be set in the controller 220. The power charger 210 and the transmitter 230 may be isolated from each other. The source resonator may initiate a self-resonance between the capacitor $C_1$ and the inductor $L_1$. Energy stored in the source resonator may be delivered to the target resonator through a mutual resonance between the source resonator and the target resonator based on a mutual inductance M 270. A resonant frequency $f_1$ of the source resonator may be equal to a resonant frequency $f_2$ of the target resonator.

$$f_1 = \frac{1}{2\pi\sqrt{L_1 C_1}}, f_2 = \frac{1}{2\pi\sqrt{L_2 C_2}} \quad f_1 = f_2$$

The wireless power reception device may include the charger 240, a controller 250, and the power output unit 260. The target resonator may include a capacitor $C_2$ and an inductor $L_2$. When a mutual resonance occurs between the source resonator and the target resonator, the source resonator may be isolated from the power supply device $V_{in}$, and the target resonator may be isolated from a load and a capacitor $C_L$. The capacitor $C_2$ and the inductor $L_2$ of the target resonator may be charged through a mutual resonance. The controller 250 may turn a switch OFF to charge the target resonator. While the switch is in an OFF state, a resonant frequency of the source resonator may be substantially equal to a resonant frequency of the target resonator, and a mutual resonance may occur. In response to power charged in the target resonator reaching a predetermined value, the controller 250 may turn the switch ON. Information of the predetermined value may be set in the controller 250. When the switch is turned ON, the capacitor $C_L$ may be connected to the target resonator, and a resonant frequency of the target resonator may change.

$$f_2' = \frac{1}{2\pi\sqrt{L_2(C_2 + C_L)}}$$

Thus, the mutual resonance between the source resonator and the target resonator may be terminated. When $f_2'$ is sufficiently small when compared to $f_2$, in consideration of Q (Quality) factor of the target resonator, a mutual resonant channel may cease to exist. The power output unit 260 may deliver, to the load, power stored in the capacitor $C_2$ and the inductor $L_2$. The power output unit 260 may deliver power in a scheme appropriate for the load.

The controller 250 may turn the switch OFF when power charged in the target resonator has a value less than a predetermined value. The charger 240 may charge the target resonator through a mutual resonance between the source resonator and the target resonator.

The switch may not be turned ON when a mutual resonance occurs between the source resonator and the target resonator. Thus, a decrease in transmission efficiency due to a connection of a switch may be prevented.

When the analog circuit of FIG. 2 is compared to an equivalent circuit of FIG. 1 in which energy charged in a capacitor is delivered, it may be easier to control a point in time of capturing energy stored in the target resonator. While the scheme of delivering energy charged in a capacitor may capture energy stored in the capacitor, a scheme of capturing energy by changing a resonant frequency may capture energy stored in an inductor and a capacitor of the target resonator and thus, a degree of freedom for the point in time of capturing energy may be enhanced.

Figure 3:
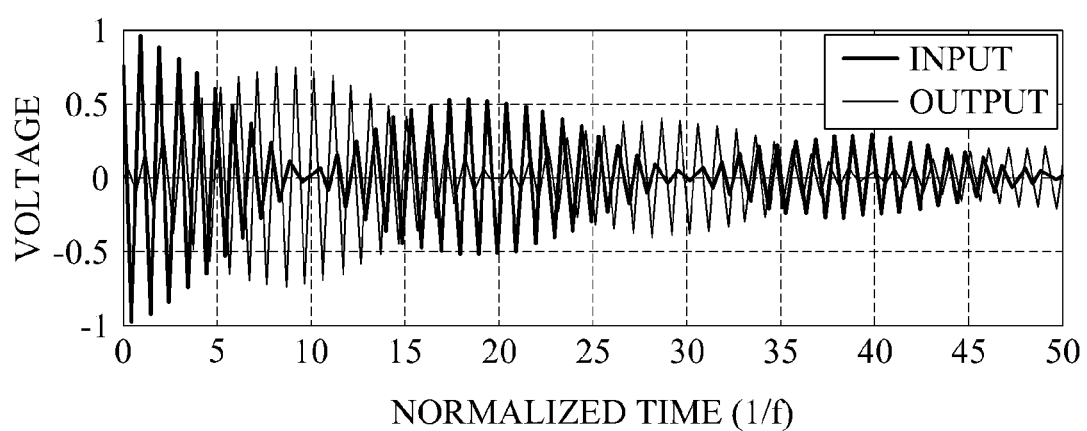
FIG. 3 is a graph illustrating a natural response of a strongly coupled transmission system using wireless power.

FIG. 3 illustrates a natural response of a strongly coupled transmission system using wireless power.

A transmission system using wireless power may correspond to a source-target configuration having a source and a target. The source may transmit data by adjusting an amount of energy stored in a source resonator. The source may transmit data using quantized energy. The target may receive data based on an amount of energy stored in a target resonator through a mutual resonance. The target may receive data mapped to quantized energy. The target may transmit data by adjusting an amount of energy stored in the target resonator. For instance, the target may control the amount of energy, stored in the target resonator to transmit data, to be less than an amount of energy received from the source since the target in the transmission system using wireless power may be based on receiving energy from the source without a supply of energy from a separate power supply device.

A scheme of modulating data by adjusting an amount of energy induced from the source resonator to the target resonator may be referred to as an induced energy modulation scheme.

In the induced energy modulation scheme, a possibility of an error occurring in data transmitted to the source by the target may increase as a distance between the source and the target increases. In a wireless power transmission system using a mutual resonance, transmission efficiency of energy may rapidly decrease as a distance between the source and the target increases. The target may receive a rapidly decreasing amount of energy transmitted from the source. In some instances, the target may need a greater amount of energy than the amount of energy received from the source to transmit data excluding errors to the source. Since the target may receive energy only from the source, the possibility of an error occurring in data transmitted by the target may increase.

A beat phenomenon may refer to the variation of the amplitude of the combined signals according to the difference in frequencies of two signals. A beat phenomenon may not occur as a distance between the source and the target increases. Within a symbol duration for a data transmission between the source and the target, energy stored in the source resonator or energy stored in the target resonator may not be entirely discharged. Due to energy remaining in the source resonator, an error may occur in data received from the target. Similarly, due to energy remaining in the target resonator, an error may occur in data received from the source.

A degree of coupling may be determined by a coupling coefficient k which may be a function of distance. Thus, k may decrease as the distance between the source and the target increases. FIG. 3 illustrates a situation in which the source and the target are strongly coupled. Referring to FIG. 3, INPUT denotes power transmitted from the source resonator, and OUTPUT denotes power delivered to the target resonator. When a strong coupling occurs, a beat phenomenon in which an INPUT value and an OUTPUT value periodically increase and decrease may occur.

Figure 4:
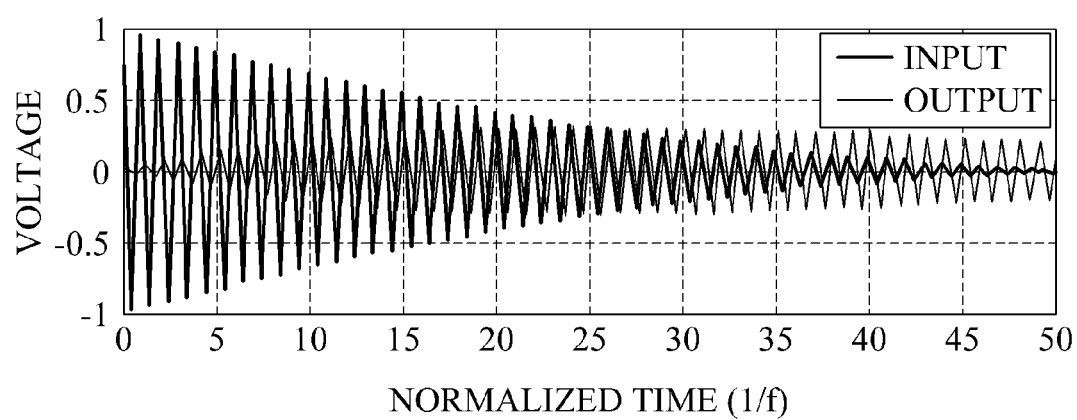
FIG. 4 is a graph illustrating a natural response of a weakly coupled transmission system using wireless power.

FIG. 4 illustrates a natural response of a weakly coupled transmission system using wireless power.

FIG. 4 illustrates a situation in which a source and a target are weakly coupled. Referring to FIG. 4, INPUT denotes power transmitted from a source resonator, and OUTPUT denotes power delivered to a target resonator. When a weak coupling occurs, a beat phenomenon in which an INPUT value and an OUTPUT value periodically increase and decrease may not occur. Consequently, the amount of energy induced in the target resonator may decrease. Thus, within a data transmission symbol duration, power stored in the source resonator and power stored in the target resonator may not be entirely discharged. When the source and the target use an induced energy modulation scheme, the chance that an error occurs in a data transmission may be relatively high.

Figure 5:
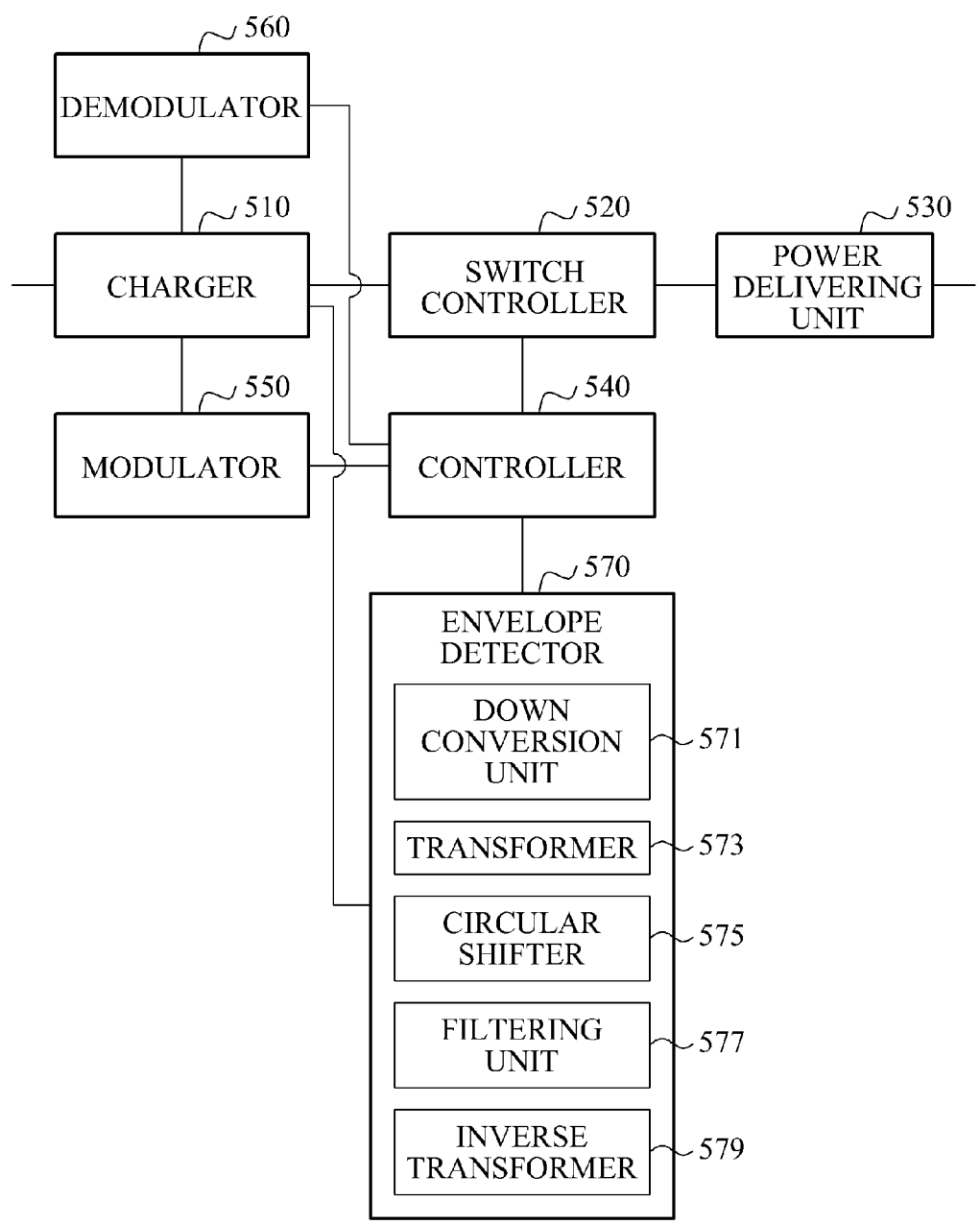
FIG. 5 is a block diagram illustrating a configuration of a reception end in a communication system using wireless power.

FIG. 5 illustrates a configuration of a reception end in a communication system using wireless power.

In the communication system using wireless power according to an aspect of the present invention, the reception end may be referred to as a communication device using wireless power. The communication device using wireless power may indicate the reception end that receives wireless power in the communication system using wireless power.

Referring to FIG. 5, the communication system using wireless power may include a charger 510, a switch controller 520, a power delivering unit 530, a controller 540, a modulator 550, a demodulator 560, and an envelope detector 570.

A target resonator at the reception end may include an inductor and a capacitor. The charger 510 may charge the inductor of the target resonator and the capacitor of the target resonator using power through a mutual resonance.

The controller 540 may determine whether a mutual resonance occurs between the target resonator and a source resonator in a symbol duration unit. As used herein, a symbol duration may denote a period of time used for transmitting a piece of data information. For example, the symbol duration may denote a period of time used for transmitting one-bit. When the distance between a self-resonating target resonator and a source resonator self-resonating at the same resonant frequency is less than a predetermined value, a mutual resonance may occur. The controller 540 may control a connection between the inductor and the capacitor so that the target resonator and the source resonator may self-resonate at the same resonant frequency. The controller 540 may control whether a mutual resonance occurs with the source resonator by changing a resonant frequency of the target resonator.

Depending on a determination of the controller 540, the target resonator may mutually resonate with the source resonator in a predetermined symbol duration, and may not mutually resonate with the source resonator in another symbol duration. The determination of the controller 540 may depend on data to be transmitted by the reception end. For example, for data 10111 desired to be transmitted, the controller 540 may determine to instruct the target resonator to mutually resonate with the source resonator when "1" is transmitted, and may determine to instruct the target resonator not to mutually resonate with the source resonator when "0" is transmitted. The controller 540 may determine to instruct the target resonator not to mutually resonate with the source resonator when "1" is transmitted, and may determine to instruct the target resonator to mutually resonate with the source resonator when "0" is transmitted. Whether a transmission of "1" or a transmission of "0" corresponds to a mutual resonance between the target resonator and the source resonator occurring at the reception end may be predetermined.

The controller 540 may control a timing of the mutual resonance occurring between the source resonator and the target resonator. The controller 540 may control a mutual resonance timing within a symbol duration, and discriminately transmit data depending on a degree of the mutual resonance timing.

In some instances, in a communication system using wireless power that utilizes charging by a capacitor, the switch controller 520 may control ON and OFF states of a switch that connects a capacitor to the charger 510 or to the power delivering unit 530 based on a determination of the controller 540. The communication system using wireless power that utilizes charging by a capacitor may have a configuration illustrated in FIG. 1. The switch controller 520 may control the switch to connect the capacitor to the charger 510 so as to generate the mutual resonance. The power delivering unit 530 may deliver power stored in the capacitor to a load. For instance, the switch controller 520 may control the switch to connect the capacitor to the load.

In other instances, in a communication system using wireless power that utilizes current charging, the switch controller 520 may control ON and OFF states of a switch that connects the charger 510 and the power delivering unit 530 based on a determination of the controller 540. The communication system using wireless power that utilizes a current charging may have a configuration as illustrated in FIG. 2. The switch controller 520 may turn the switch that connects the charger 510 and the power delivering unit 530 OFF to generate a mutual resonance. The power delivering unit 530 may deliver power stored in the inductor and the capacitor to a load. For instance, the switch controller 520 may turn the switch that connects the charger 510 and the power delivering unit 530 OFF.

The controller 540 may change a resonant frequency of the target resonator in the symbol duration unit. The controller 540 may change a resonant frequency of the target resonator by connecting an additional capacitor to the target resonator. When multiple capacitors are included in the target resonator, the controller 540 may change a resonant frequency by electrically disconnecting a predetermined capacitor.

After changing a resonant frequency, the controller 540 may capture power stored in the target resonator within a predetermined period of time. The controller 540 may recognize data received from the target resonator based on an amount of power captured. The controller 540 may control the switch controller 520 to deliver the captured power to a load.

The modulator 550 may modulate data based on whether a mutual resonance occurs between the target resonator and the source resonator. The modulator 550 may allocate data in both a case in which a mutual resonance occurs, and a case in which a mutual resonance does not occur. Data may be provided from the controller 540, in some instances. The modulator 550 may modulate data according to a timing of a mutual resonance between the target resonator and the source resonator. For example, the modulator 550 may modulate data according to duration of a mutual resonance.

The demodulator 560 may demodulate data based on an amount of power stored in the target resonator in a symbol duration unit. At the transmission end, a source may modulate data by adjusting an amount of power stored in the source resonator in a symbol duration unit. The demodulator 560 may demodulate data that matches an amount of power stored in the target resonator in a symbol duration unit. A mapping relation of the stored power and the data may be preset in the controller 540. Information of the mapping relation may be shared between the transmission end and the reception end.

For example, the amount of power stored in the target resonator may be detected through an analog-digital conversion (ADC) sampling from a current or a voltage applied to the target resonator. An accurate detection of an amount of power may involve a sufficiently fast ADC sampling rate in comparison with a resonant frequency of the target resonator. A relatively fast ADC sampling rate may indicate a relatively great power consumption of an analog-digital converter, and may cause energy transmission efficiency and data transmission efficiency to hinge on an ADC sampling rate and a number of quantization bits. The envelope detector 570 may use an appropriately fast ADC sampling rate, and may accurately detect an amount of power stored in the target resonator.

The envelope detector 570 may detect an envelope in a waveform of current or voltage applied to the target resonator. For instance, the envelope detector 570 may use an analog circuit for detecting an envelope. The analog circuit for detecting an envelope may receive an input of current applied to the target resonator or voltage applied to the target resonator, and output an envelope of the current or the voltage.

The envelope detector 570 may include a down conversion unit 571, a transformer 573, a circular shifter 575, a filtering unit 577, and an inverse transformer 579.

The down conversion unit 571 may generate a down-converted signal by multiplying one of predetermined signal waveforms of a resonant frequency by a signal that is ADC sampled from current or voltage applied to the target resonator. In this instance, the predetermined signal waveforms may include a sine waveform, a cosine waveform, and an exponential waveform of a resonant frequency. A down conversion scheme may use a scheme generally used in communication. For example, the down conversion unit 571 may down-convert an ADC sampled signal to a baseband. The transformer 573 may transform the down-converted signal into a frequency domain signal using the discrete Fourier transform (DFT) or the fast Fourier transform (FFT). The filtering unit 577 may generate a signal from which a harmonic component is removed by applying low-pass filtering to the frequency domain signal. The harmonic component may refer to a noise component included in the frequency domain signal. The inverse transformer 579 may transform the signal from which a harmonic component is removed into a time domain signal using the inverse DFT or the inverse FFT. The transformed time domain signal may indicate an envelope of a waveform of current or voltage applied to the target resonator.

The transformer 573 may transform a signal that is ADC sampled from the current or the voltage applied to the target resonator into a frequency domain signal using the DFT or the FFT. The circular shifter 575 may perform a circular shift of the frequency domain signal by a predetermined frequency. For example, the circular shifter 575 may circular shift a frequency domain signal to a baseband. The circular shifter 575 may circular shift the frequency domain signal by a predetermined frequency, thereby facilitating a filtering by the filtering unit 577. The filtering unit 577 may generate a signal from which a harmonic component is removed by applying low-pass filtering to the circular-shifted signal. The inverse transformer 579 may transform the signal from which a harmonic component is removed into a time domain signal using the inverse DFT or the inverse FFT. In this instance, the transformed time domain signal may indicate an envelope of a waveform of a current or a voltage applied to the target resonator.

The down conversion unit 571 may generate a down-converted signal by multiplying one of predetermined signal waveforms of a resonant frequency by a signal that is ADC sampled from a current or a voltage applied to the target resonator. The filtering unit 577 may generate a signal from which a harmonic component is removed by applying low-pass filtering to the down-converted signal using convolution in a time domain. The filtering unit 577 may perform low-pass filtering in a frequency domain in addition to the time domain. The signal from which a harmonic component is removed may indicate an envelope of a waveform of a current or a voltage applied to the target resonator.

The envelope detector 570 may detect an envelope in a waveform of current or voltage applied to the target resonator using various signal processing schemes in a digital domain.

Figure 6:
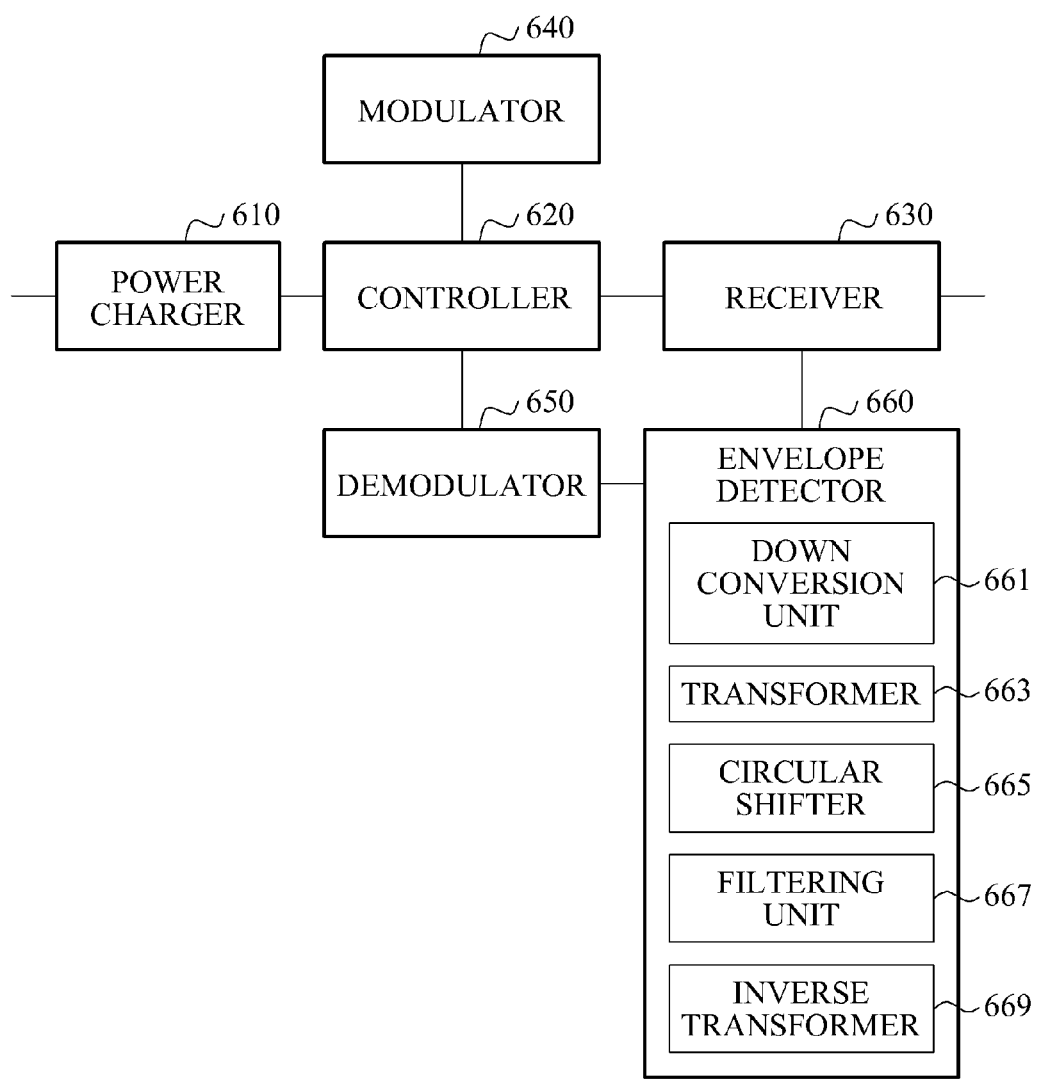
FIG. 6 is a block diagram illustrating a configuration of a transmission end in a communication system using wireless power.

FIG. 6 illustrates a configuration of a transmission end in a communication system using wireless power.

In the communication system using wireless power according to an aspect of the present invention, the transmission end may be referred to as a communication device using wireless power. The communication device using wireless power may indicate the transmission end that transmits wireless power in the communication system using wireless power.

Referring to FIG. 6, the communication system using wireless power may include a power charger 610, a controller 620, a receiver 630, a modulator 640, a demodulator 650, and an envelope detector 660.

The power charger 610 may charge a source resonator using power provided from a power supply device. The controller 620 may adjust an amount of power stored in the source resonator within a symbol duration. Data may discriminately be allocated depending on an amount of power stored in the source resonator. The controller 620 may control a charging time of the source resonator within a symbol duration. The amount of power stored in the source resonator may vary depending on the charging time of the source resonator.

The receiver 630 may receive data through a mutual resonance between the source resonator and a target resonator. Attenuation of energy stored in the source resonator may change depending on whether a mutual resonance with the target resonator occurs. Since the source resonator and the target resonator exchange energy when a mutual resonance occurs, a change in attenuation of energy stored in the source resonator may be great when compared to a case in which the mutual resonance does not occur. Since the source resonator may not deliver energy to the target resonator when the mutual resonance does not occur, energy stored in the source resonator may be attenuated according to a natural attenuation. The receiver 630 may receive allocated data based on whether a mutual resonance occurs.

The modulator 640 may control an amount of power stored in the source resonator, and modulate data based on the amount of power stored in the source resonator. Data may be allocated based on the amount of stored power. A mapping relation between data and the amount of stored power may be preset in the controller 620.

The demodulator 650 may demodulate data based on whether a mutual resonance occurs between the source resonator and the target resonator. For example, a target at the reception end may set, to "1," a case in which the mutual resonance occurs and set, to "0," a case in which the mutual resonance does not occur, and may transmit data, for example, 10111. The demodulator 650 may demodulate the data 10111 by identifying whether a mutual resonance of the source resonator occurs.

The demodulator 650 may demodulate data based on an amount of power stored in the source resonator. The amount of power stored in the source resonator may vary depending on whether a mutual resonance occurs between the source resonator and the target resonator. The demodulator 650 may demodulate data based on an amount of power stored in the source resonator in a symbol duration unit. The demodulator 650 may identify a difference between an amount of power stored in the source resonator when a mutual resonance occurs and the amount of power stored in the source resonator when a mutual resonance does not occur, and may demodulate data based on the identification.

The demodulator 650 may demodulate data based on the amount of change of power stored in the source resonator. For instance, the amount of change of stored power may be relatively great when a mutual resonance occurs, and may not be relatively great when a mutual resonance does not occur.

The demodulator 650 may demodulate data based on a timing of a mutual resonance between the target resonator and the source resonator. The demodulator 650 may demodulate data according to the duration of a mutual resonance.

Whether a mutual resonance between the target resonator and the source resonator occurs may be identified through an ADC sampling from current or voltage applied to the target resonator. An accurate identification may involve a sufficiently fast ADC sampling rate in comparison with a resonant frequency of the source resonator. A relatively fast ADC sampling rate may indicate a relatively great power consumption of an analog-digital converter, and may cause energy transmission efficiency and data transmission efficiency to depend on an ADC sampling rate and a number of quantization bits. The envelope detector 660 may use an appropriately fast ADC sampling rate, and may accurately identify whether a mutual resonance occurs through a detected envelope.

The envelope detector 660 may detect an envelope in a waveform of current or voltage applied to the source resonator. The demodulator 650 may determine whether a mutual resonance occurs between the target resonator and the source resonator by comparing the detected envelope with a predetermined value, and may demodulate data based on whether the mutual resonance occurs. The demodulator 650 may demodulate data by comparing attenuations of envelopes detected in a symbol duration unit. For example, the demodulator 650 may determine the mutual resonance occurs when an attenuation of a detected envelope is relatively great, and may determine the mutual resonance does not occur when an attenuation of a detected envelope is relatively small.

The envelope detector 660 may use an analog circuit for detecting an envelope. The analog circuit for detecting an envelope may receive an input of current applied to the source resonator or voltage applied to the source resonator, and output an envelope of the current or the voltage.

The envelope detector 660 may detect an envelope through a signal processing in a digital domain. In this instance, the envelope detector 660 may include a down conversion unit 661, a transformer 663, a circular shifter 665, a filtering unit 667, and an inverse transformer 669.

The down conversion unit 661 may generate a down-converted signal by multiplying one of predetermined signal waveforms of a resonant frequency by a signal that is ADC sampled from current or voltage applied to the source resonator. For instance, the predetermined signal waveforms may include a sine waveform, a cosine waveform, and an exponential waveform of a resonant frequency. A down conversion scheme may use a scheme generally used in communication. The down conversion unit 661 may transform the down-converted signal into a frequency domain signal using the DFT or the FFT. The filtering unit 667 may generate a signal from which a harmonic component is removed by applying low-pass filtering to the frequency domain signal. The harmonic component may refer to a noise component included in the frequency domain signal. The inverse transformer 669 may be configured to transform the signal from which a harmonic component is removed, into a time domain signal using the inverse DFT or the inverse FFT. For instance, the transformed time domain signal may indicate an envelope of a waveform of current or voltage applied to the source resonator.

The transformer 663 may transform a signal that is ADC sampled from the current or the voltage applied to the source resonator into a frequency domain signal using the DFT or the FFT. The circular shifter 665 may perform a circular shift of the frequency domain signal by a predetermined frequency. For example, the circular shifter 665 may circular shift a frequency domain signal to a baseband. The circular shifter 665 may circular shift the frequency domain signal by a predetermined frequency, thereby facilitating filtering by the filtering unit 667. The filtering unit 667 may generate a signal from which a harmonic component is removed by applying low-pass filtering to the circular-shifted signal. The inverse transformer 669 may transform the signal from which a harmonic component is removed, into a time domain signal using the inverse DFT or the inverse FFT. The transformed time domain signal may indicate an envelope of a waveform of current or voltage applied to the source resonator.

The down conversion unit 661 may generate a down-converted signal by multiplying one of predetermined signal waveforms of a resonant frequency by a signal that is ADC sampled from current or voltage applied to the target resonator. The filtering unit 667 may generate a signal from which a harmonic component is removed by applying low-pass filtering to the down-converted signal using convolution in a time domain. The filtering unit 667 may perform low-pass filtering in a frequency domain in addition to the time domain. For instance, the signal from which a harmonic component is removed may indicate an envelope of a waveform of current or voltage applied to the source resonator.

The envelope detector 660 may detect an envelope in a waveform of current or voltage applied to the source resonator using various signal processing schemes in a digital domain.

Figure 7:
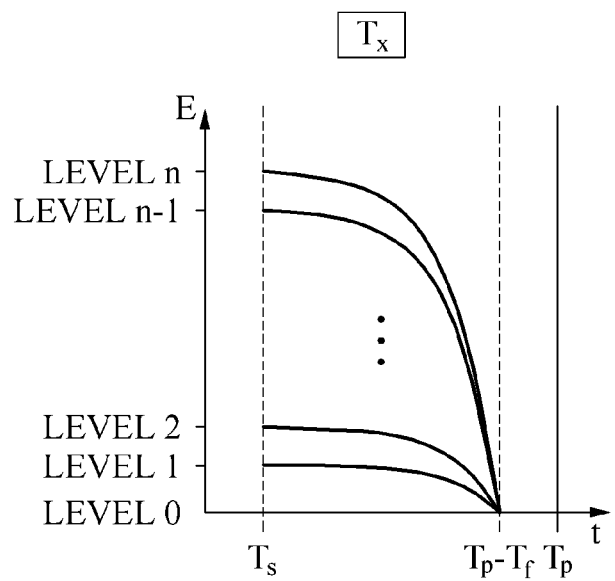
FIG. 7 is a graph illustrating data transmitted by a transmission end ($T_x$) and data received by a reception end ($R_x$) in a communication system using wireless power.
Figure 7:
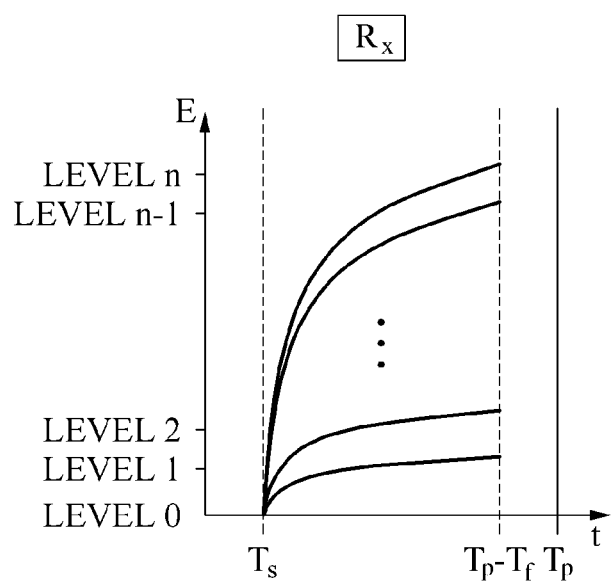

FIG. 7 illustrates data transmitted by a transmission end $T_x$ and data received by a reception end $R_x$ in a communication system using wireless power.

Referring to FIG. 7, the transmission end $T_x$ may transmit data by adjusting energy stored in a source resonator, and the reception end $R_x$ may receive data based on energy stored in a target resonator.

n+1 energy levels may be predetermined between the transmission end $T_x$ and the reception end $R_x$, and data may be allocated for one or more energy levels. The transmission end $T_x$ may transmit log(n+1) bit information in a single symbol duration.

Energy stored in the source resonator may be delivered to the target resonator through a mutual resonance between the source resonator and the target resonator. $T_s$ denotes a period of time used for the source resonator to prepare for a mutual resonance, and may correspond to a period of time used for connecting the capacitor to the source resonator of FIG. 1, and may correspond to a period of time used for turning the switch that connects the power supply device and the source resonator of FIG. 2 OFF. During a period of time $T_p$-$T_f$, an entire energy stored in the source resonator may be delivered to the target resonator. At a point in time $T_p$-$T_f$, the reception end $R_x$ may terminate a mutual resonance of the target resonator, and may decode data received based on energy stored in the target resonator.

Figure 8:
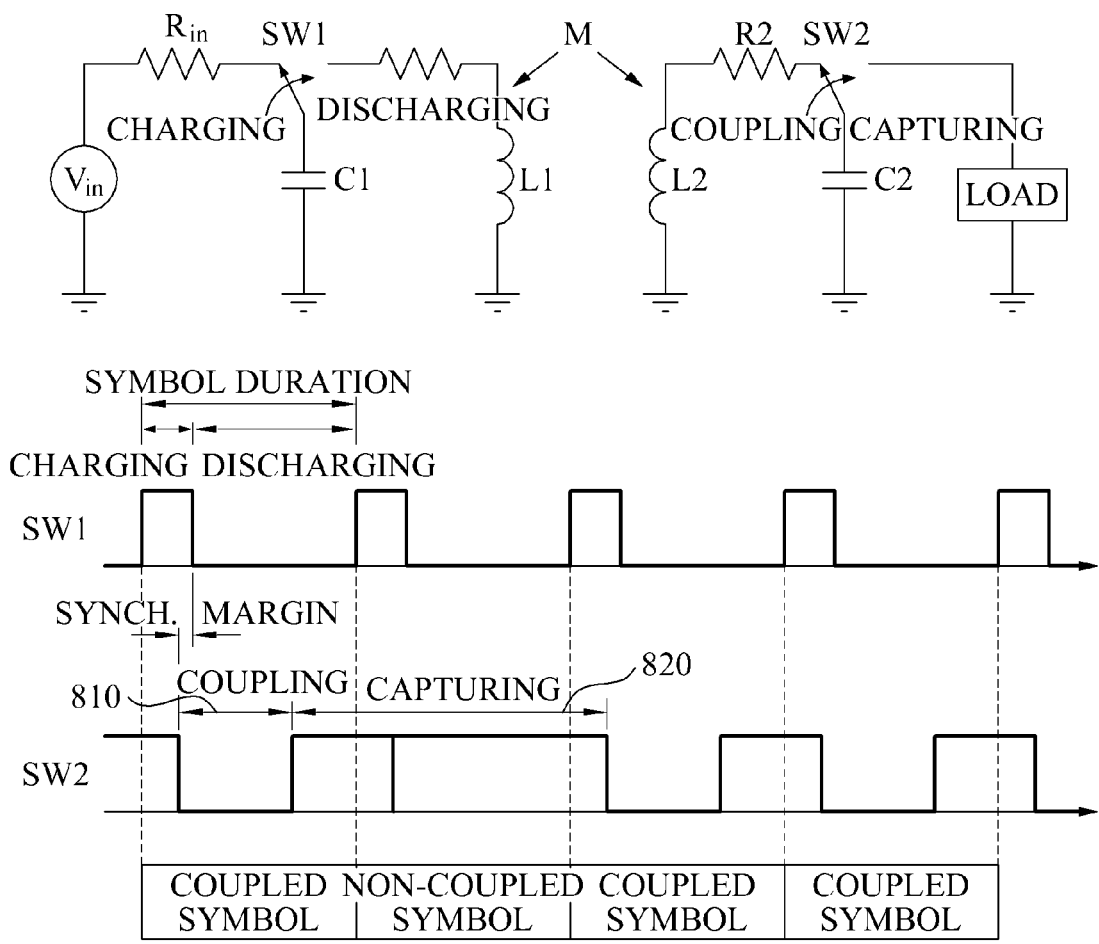
FIG. 8 is a diagram illustrating transmitting data from a reception end to a transmission end through a mutual resonance in a communication system using wireless power that utilizes voltage charging by a capacitor.

FIG. 8 illustrates transmitting data from a reception end to a transmission end through a mutual resonance in a communication system using wireless power that utilizes charging by a capacitor.

Referring to FIG. 8, the transmission end may charge a capacitor C1 by applying a voltage to the capacitor C1, and may discharge power stored in the capacitor C1 through a source resonator including the capacitor C1 and an inductor L1. The transmission end may control a charge and a discharge through a switch SW1. The source resonator may deliver power stored in the capacitor C1 to a target resonator through a coupling with the target resonator. The coupling may refer to a mutual resonance.

The coupling between the source resonator and the target resonator may be affected by a mutual inductance M.

The target resonator may include an inductor L2 and a capacitor C2. The target resonator may receive power from the source resonator through a coupling. Thus, the inductor L2 and the capacitor C2 may be charged. The reception end may capture power stored in the capacitor C2, and deliver the power to a load. The reception end may control a coupling and a capturing through a switch SW2. The reception end may turn the switch SW2 connected to the inductor L2 to be connected to the load OFF, thereby terminating the coupling with the source resonator.

The transmission end may control the switch SW1 in a single symbol duration to perform charging and discharging. For instance, the reception end may determine whether to perform a coupling by controlling the switch SW2. The reception end may secure a synchronization margin used for synchronizing a coupling time of the transmission end and the reception end before a point in time of a discharge of the reception end and the transmission end. The reception end may perform a coupling operation 810, and may perform a capturing operation 820 in a symbol duration unit. The reception end may modulate and transmit data according to whether a coupling is performed. Since natural responses of power stored in the source resonator may have different waveforms depending on whether a coupling is performed, the transmission end may demodulate data transmitted by the reception end based on whether a coupling is performed.

Figure 9:
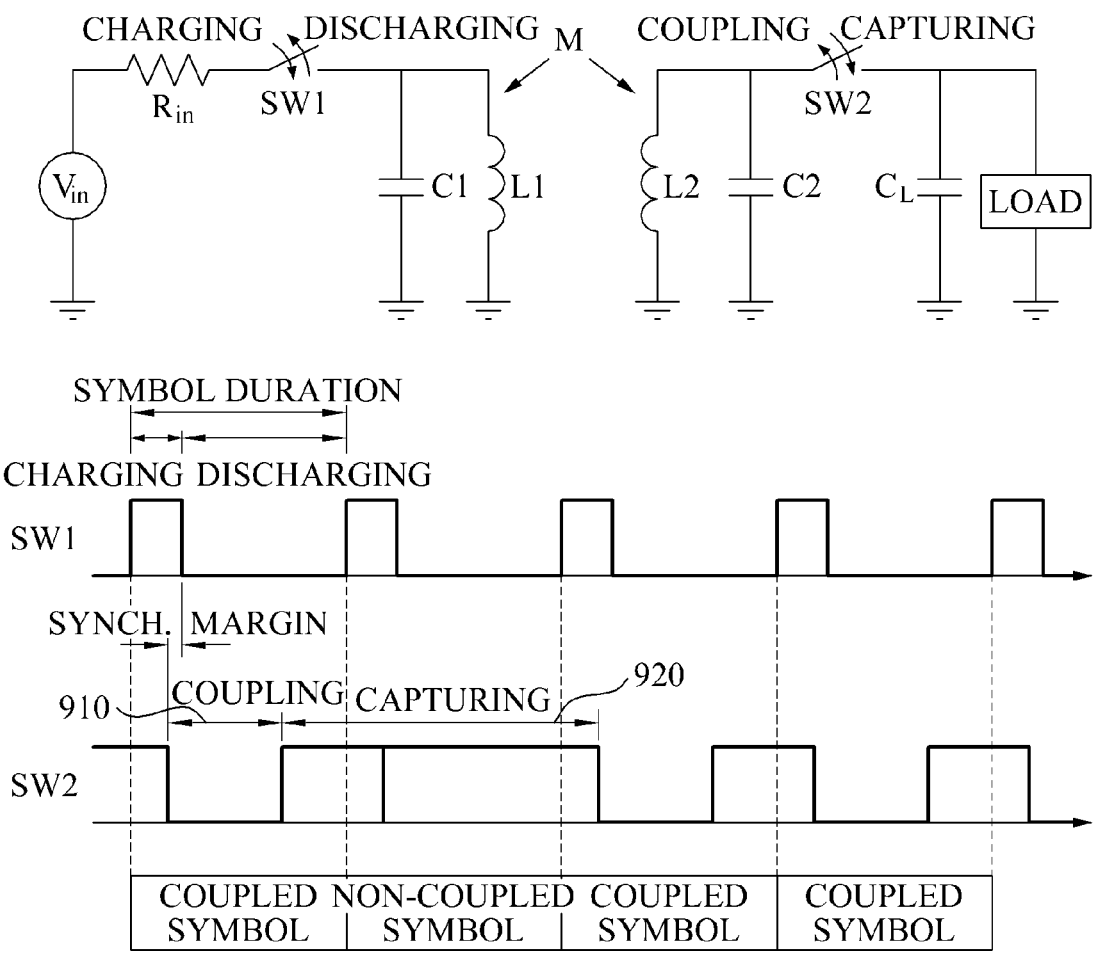
FIG. 9 is a diagram illustrating transmitting data from a reception end to a transmission end through a mutual resonance in a communication system using wireless power that utilizes current charging.

FIG. 9 illustrates transmitting data from a reception end to a transmission end through a mutual resonance in a communication system using wireless power that utilizes a current charging.

Referring to FIG. 9, the transmission end may charge an inductor L1 by applying current to the inductor L1, and may discharge power stored in the inductor L1 through a source resonator including a capacitor C1 and the inductor L1 at a steady state. The transmission end may control charging and discharging through a switch SW1. The source resonator may deliver power stored in the inductor L1 to a target resonator through a coupling with the target resonator. The coupling may refer to a mutual resonance.

The coupling between the source resonator and the target resonator may be affected by a mutual inductance M.

The target resonator may include an inductor L2 and a capacitor C2. The target resonator may receive power from the source resonator through a coupling. Thus, the inductor L2 and the capacitor C2 may be charged. The reception end may capture power stored in the inductor and the capacitor C2, and deliver the power to a load. The reception end may control a coupling and a capturing through a switch SW2. The reception end may turn ON the switch SW2 to connect a capacitor $C_L$ to the target resonator, which may change a resonant frequency of the target resonator and thus, the coupling with the source resonator may be terminated.

The transmission end may control the switch SW1 in a single symbol duration to perform charging and discharging. For instance, the reception end may determine whether to perform a coupling by controlling the switch SW2. The reception end may secure a synchronization margin used for synchronizing a coupling time of the transmission end and the reception end before a point in time of a discharge of the reception end and the transmission end. The reception end may perform a coupling 910, and may perform a capturing 920 in a symbol duration unit. The reception end may modulate and transmit data according to whether a coupling is performed. Since natural responses of power stored in the source resonator may have different waveforms depending on whether a coupling is performed, the transmission end may demodulate data transmitted by the reception end based on whether a coupling is performed.

Figure 10:
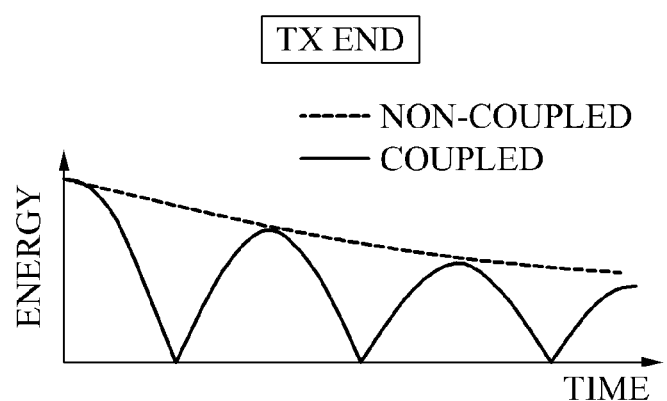
FIG. 10 is a graph illustrating a change of energy applied to a source resonator and a target resonator that are strongly coupled in a communication system using wireless power.
Figure 10:
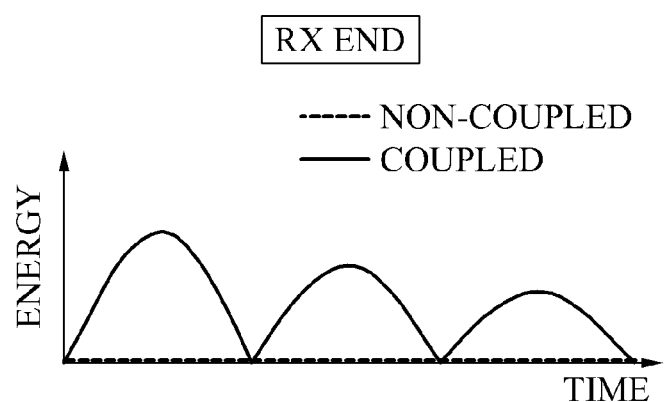

FIG. 10 illustrates a change of energy applied to a source resonator and a target resonator that are strongly coupled in a communication system using wireless power.

At a transmission (TX) end, a signal applied to the source resonator may have different waveforms between a case in which the source resonator and the target resonator are strongly coupled and a case in which the source resonator and the target resonator are not coupled. At a reception (RX) end, a signal applied to the target resonator may have significantly different waveforms between a case in which the source resonator and the target resonator are strongly coupled and a case in which the source resonator and the target resonator are not coupled.

The RX end may modulate data based on whether a coupling is performed, and the TX end may compare a signal waveform corresponding to a case in which a coupling is performed and a signal waveform corresponding to a case in which a coupling is not performed, and may demodulate data transmitted by the RX end based on a comparison result.

Figure 11:
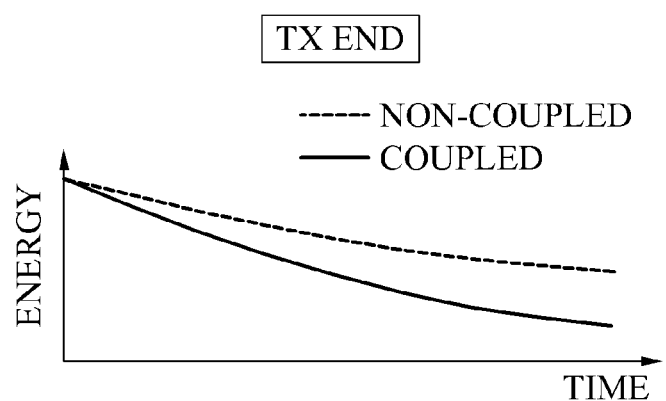
FIG. 11 is a graph illustrating a change of energy applied to a source resonator and a target resonator that are weakly coupled in a communication system using wireless power.
Figure 11:
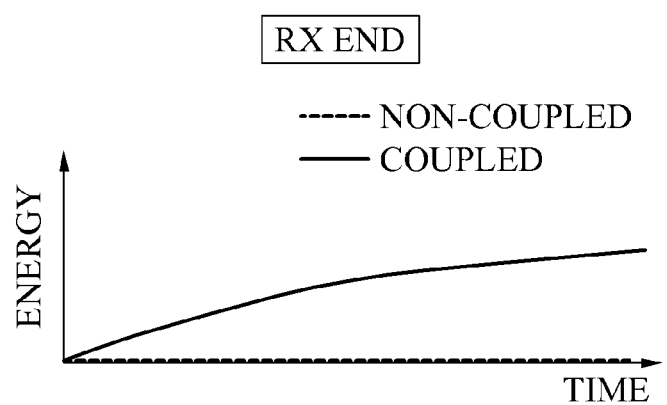

FIG. 11 illustrates a change of energy applied to a source resonator and a target resonator that are weakly coupled to one another in a communication system using wireless power.

At a TX end, a signal applied to the source resonator may have different waveforms between a case in which the source resonator and the target resonator are weakly coupled, and a case in which the source resonator and the target resonator are not coupled. At an RX end, a signal applied to the target resonator may have significantly different waveforms between a case in which the source resonator and the target resonator are weakly coupled, and a case in which the source resonator and the target resonator are not coupled.

The RX end may modulate data based on whether a coupling is performed, and the TX end may compare a signal waveform corresponding to a case in which a coupling is performed and a signal waveform corresponding to a case in which a coupling is not performed, and may demodulate data transmitted by the RX end based on a comparison result.

Figure 12:
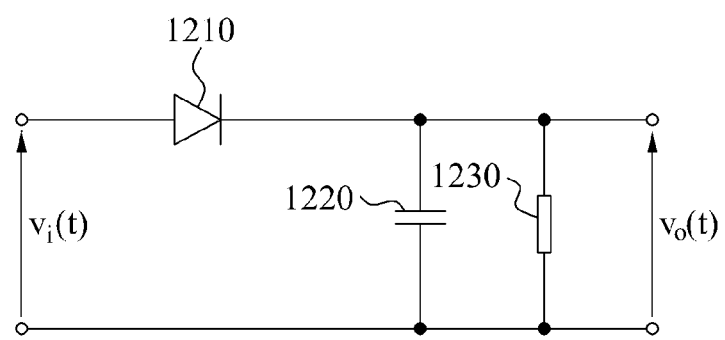
FIG. 12 is a diagram illustrating an analog circuit for detecting an envelope.

FIG. 12 illustrates an analog circuit for detecting an envelope.

Referring to FIG. 12, the analog circuit for detecting an envelope according to an aspect may include a diode 1210, a capacitor 1220, and a load 1230. For instance, the analog circuit for detecting an envelope may receive an input of current applied to the source resonator or voltage applied to the source resonator, and may output an envelope of the current applied to a source resonator or the voltage applied to the source resonator. The analog circuit for detecting an envelope may receive an input of current applied to a target resonator or voltage applied to the target resonator, and may output an envelope of the current applied to the target resonator or the voltage applied to the target resonator.

Various circuits configured for detecting an envelope may be used in addition to the analog circuit illustrated in FIG. 12.

Figure 13:
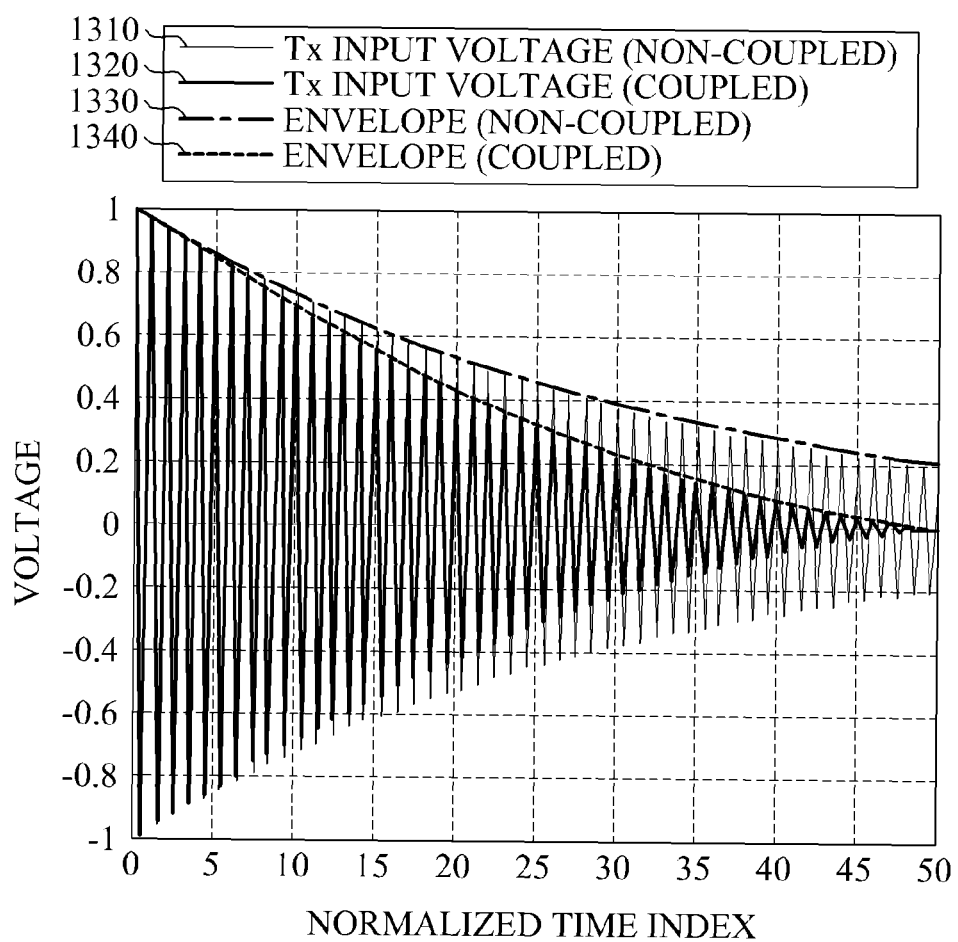
FIG. 13 is a graph illustrating a natural response of voltage applied to a weakly coupled source resonator and an envelope of the natural response in a communication system using wireless power.

FIG. 13 illustrates a graph of a natural response of a voltage applied to a weakly coupled source resonator and an envelope of the natural response in a communication system using wireless power.

The graph in FIG. 13 illustrates a natural response signal 1320 of a voltage applied to the source resonator and an envelope 1340 of the natural response signal 1320 when the source resonator is coupled with a target resonator under conditions of which the source resonator and the target resonator may be weakly coupled, and illustrates a natural response signal 1310 of a voltage applied to the source resonator and an envelope 1330 of the natural response signal 1310 when the source resonator is not coupled with a target resonator. The coupling may refer to a mutual resonance.

A relatively considerable sampling rate may be used for determining whether a coupling is performed through an ADC sampling in the natural response signal 1310 and the natural response signal 1320. A transmission end may detect the envelope 1330 and the envelope 1340 from a signal that is sampled at a relatively small rate, and compare the sampled rates with a predetermined value, thereby more effectively determining whether a coupling is performed. The transmission end may compare the envelope 1330 and the envelope 1340, thereby determining whether a coupling is performed.

One example of a waveform of voltage applied to the source resonator, and current applied to the source resonator is illustrated in FIG. 13. The amount of energy stored in the source resonator may have a similar envelope form.

Figure 14:
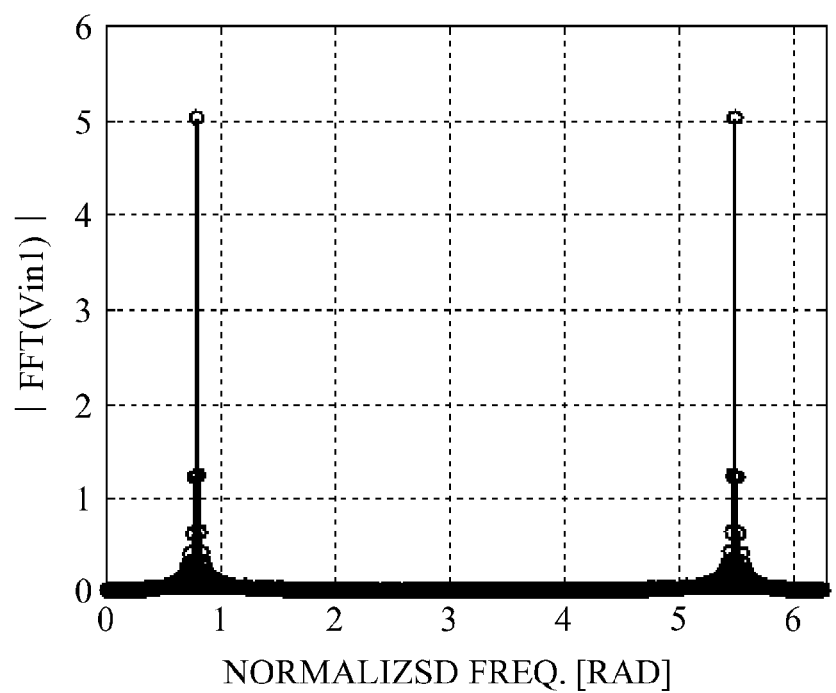
FIG. 14 is a graph illustrating a natural response, in a frequency domain, of voltage applied to a weakly coupled source resonator in a communication system using wireless power.

FIG. 14 illustrates a natural response, in a frequency domain, of voltage applied to a weakly coupled source resonator in a communication system using wireless power.

Referring to FIG. 14, a result of converting the natural response signal of FIG. 13 into a frequency domain signal through the FFT is illustrated.

Figure 15A:
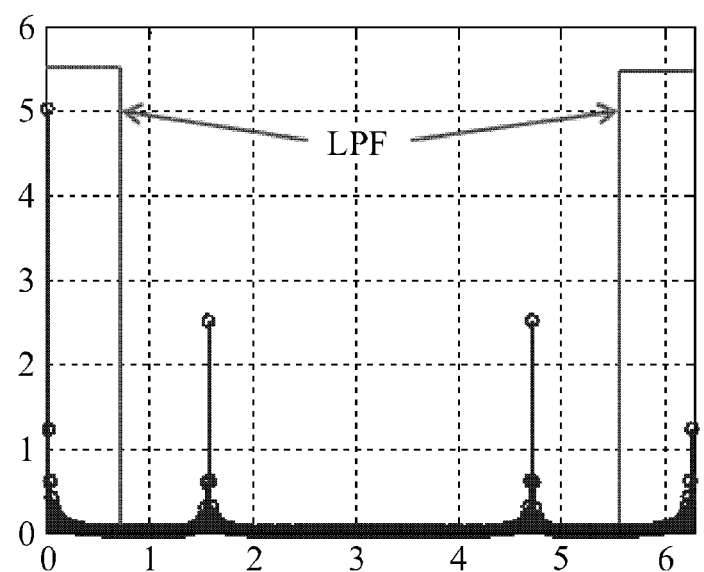
FIGS. 15A and 15B are diagrams illustrating detecting an envelope through a digital processing in a communication system using wireless power.
Figure 15B:
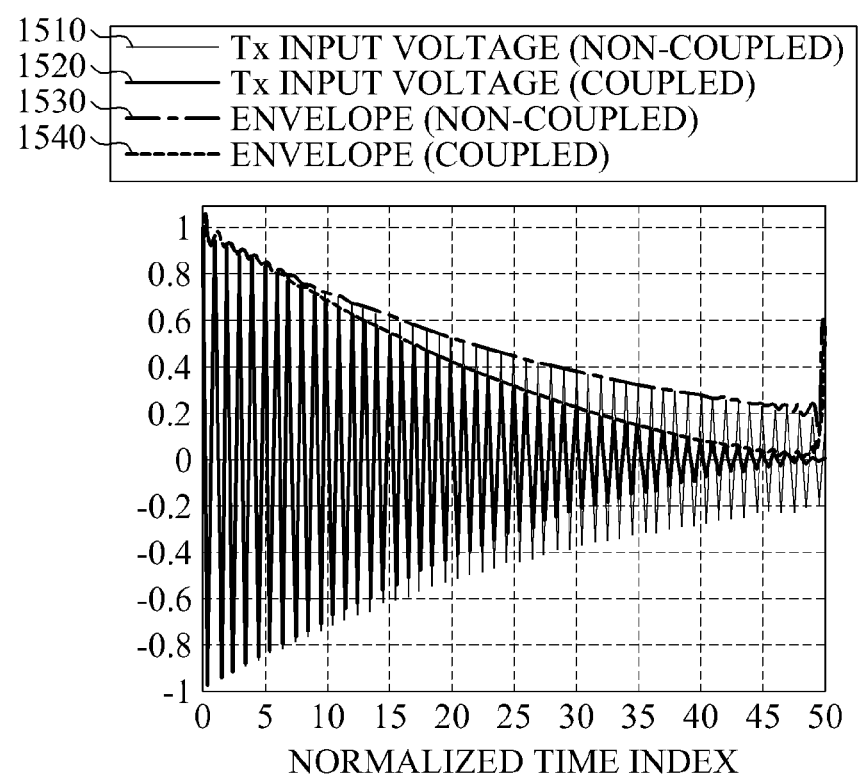

FIGS. 15A and 15B illustrate detecting an envelope through a digital processing in a communication system using wireless power.

FIG. 15A illustrates frequency domain signals down-converted by combining one of a sine waveform, a cosine waveform, and an exponential waveform with the frequency domain signal of FIG. 14. The communication system using wireless power may remove a harmonic component by applying LPF to the down-converted frequency domain signals. The communication system using wireless power may inverse transform a signal from which a harmonic component is removed in a time domain signal, and calculate an envelope in a time domain. FIG. 15B illustrates envelopes calculated by performing the IFFT for a frequency domain signal from which a harmonic component is removed. The communication system using wireless power may calculate an envelope 1530 and an envelope 1540 through a digital processing from a natural response signal 1510 of voltage applied to a source resonator when a coupling with a target resonator does not occur and a natural response signal 1520 of voltage applied to a source resonator when a coupling with a target resonator occurs.

The units and other elements described herein may be implemented using hardware components, software components, or a combination thereof, in some embodiments. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums. The computer readable recording medium may include any data storage device that can store data which can be thereafter read by a computer system or processing device. Examples of the computer readable recording medium include read-only memory (ROM), random-access memory (RAM), CD-ROMs, magnetic tapes, floppy disks, optical data storage devices. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A communication device using wireless power, the communication device comprising:
   a controller configured to determine whether a mutual resonance occurs between a target resonator and a source resonator in a symbol duration; and
   a modulator configured to modulate data, based on whether the mutual resonance occurs;
   a charger configured to charge an inductor and a capacitor using power through the mutual resonance;
   a power delivering unit configured to deliver power stored in the capacitor to a load; and
   a switch controller configured to control a switch that connects the capacitor to the charger or to the power delivering unit, based on a determination of the controller,
   wherein the target resonator includes the inductor and the capacitor.

2. The communication device of claim 1, wherein the switch controller is configured to control the switch to connect the capacitor to the charger so as to generate the mutual resonance.

3. The communication device of claim 1,
   wherein the power delivering unit is configured to deliver power stored in the inductor and the capacitor to the load; and
   wherein the switch controller is configured to control the switch that connects the capacitor to the power delivering unit, based on a determination of the controller.

4. The communication device of claim 3, wherein the controller is configured to:
   change a resonant frequency of the target resonator; and
   capture power stored in the target resonator within a predetermined period of time.

5. The communication device of claim 1, further comprising:
   a demodulator configured to demodulate data based on an amount of power stored in the target resonator, in response to a termination of the mutual resonance.

6. The communication device of claim 1, wherein the controller is configured to control a timing of the mutual resonance occurring between the source resonator and the target resonator.

7. The communication device of claim 1, further comprising:
   an envelope detector configured to detect an envelope in a waveform of current or voltage applied to the target resonator.

8. The communication device of claim 7, wherein the envelope detector is configured to acquire the envelope from an output of an analog circuit for detecting an envelope in response to an input of the current or the voltage.

9. The communication device of claim 7, wherein the envelope detector comprises:
   a down conversion unit configured to generate a down-converted signal by multiplying one of predetermined signal waveforms of a resonant frequency by a signal that is analog-digital conversion (ADC) sampled from the current or the voltage;
   a transformer configured to transform the down-converted signal into a frequency domain signal using the discrete Fourier transform (DFT) or the fast Fourier transform (FFT);
   a filtering unit configured to generate a signal from which a harmonic component is removed by applying low-pass filtering to the frequency domain signal; and
   an inverse transformer configured to transform the signal from which a harmonic component is removed into a time domain signal using the inverse DFT or the inverse FFT.

10. The communication device of claim 7, wherein the envelope detector comprises:
    a transformer configured to transform a signal that is analog-digital conversion (ADC) sampled from the current or the voltage into a frequency domain signal using the discrete Fourier transform (DFT) or the fast Fourier transform (FFT);
    a circular shifter configured to perform a circular shift of the frequency domain signal by a predetermined frequency;
    a filtering unit configured to generate a signal from which a harmonic component is removed by applying low-pass filtering to the circular-shifted signal; and
    an inverse transformer configured to transform the signal from which a harmonic component is removed into a time domain signal using the inverse DFT or the inverse FFT.

11. The communication device of claim 7, wherein the envelope detector comprises:
    a down conversion unit configured to generate a down-converted signal by multiplying one of predetermined signal waveforms of a resonant frequency by a signal that is analog-digital conversion (ADC) sampled from the current or the voltage; and
    a filtering unit configured to generate a signal from which a harmonic component is removed by applying low-pass filtering to the down-converted signal using convolution in a time domain.

12. A communication device using wireless power, the communication device comprising:
    a receiver configured to receive data from a target resonator through a mutual resonance between a source resonator and the target resonator; and
    a demodulator configured to demodulate the data in a symbol duration, based on an amount of power stored in the source resonator;
    a power charger configured to charge the source resonator using power provided from a power supply device; and
    a modulator configured to control the amount of power stored in the source resonator, and modulate data, based on the amount of power.

13. The communication device of claim 12, further comprising:
    a controller configured to control a charging time of the source resonator.

14. The communication device of claim 12, wherein the demodulator is configured to demodulate the data by comparing an amount of power stored in the source resonator when the mutual resonance occurs between the source resonator and the target resonator with an amount of power stored in the source resonator when the mutual resonance does not occur between the source resonator and the target resonator.

15. The communication device of claim 12, wherein the demodulator is configured to demodulate the data based on whether the mutual resonance occurs between the source resonator and the target resonator.

16. The communication device of claim 12, further comprising:
    an envelope detector configured to detect an envelope in a waveform of current or voltage applied to the source resonator.

17. The communication device of claim 16, wherein the demodulator is configured to determine whether the mutual resonance occurs between the source resonator and the target resonator, by comparing the detected envelope with a predetermined value, and demodulate the data, based on whether the mutual resonance occurs.

18. The communication device of claim 16, wherein the envelope detector is configured to acquire the envelope from an output of an analog circuit for detecting an envelope in response to an input of the current or the voltage.

19. The communication device of claim 16, wherein the envelope detector comprises:
  a down conversion unit configured to generate a down-converted signal by multiplying one of predetermined signal waveforms of a resonant frequency by a signal that is analog-digital conversion (ADC) sampled from the current or the voltage;
  a transformer configured to transform the down-converted signal into a frequency domain signal using the discrete Fourier transform (DFT) or the fast Fourier transform (FFT);
  a filtering unit configured to generate a signal from which a harmonic component is removed by applying low-pass filtering to the frequency domain signal; and
  an inverse transformer configured to transform the signal from which a harmonic component is removed into a time domain signal using the inverse DFT or the inverse FFT.

20. The communication device of claim 16, wherein the envelope detector comprises:
  a transformer configured to transform a signal that is analog-digital conversion (ADC) sampled from the current or the voltage into a frequency domain signal using the discrete Fourier transform (DFT) or the fast Fourier transform (FFT);
  a circular shifter configured to perform a circular shift of the frequency domain signal by a predetermined frequency;
  a filtering unit configured to generate a signal from which a harmonic component is removed by applying low-pass filtering to the circular-shifted signal; and
  an inverse transformer configured to transform the signal from which a harmonic component is removed into a time domain signal using the inverse DFT or the inverse FFT.

21. The communication device of claim 16, wherein the envelope detector comprises:
  a down conversion unit configured to generate a down-converted signal by multiplying one of predetermined signal waveforms of a resonant frequency by a signal that is analog-digital conversion (ADC) sampled from the current or the voltage; and
  a filtering unit configured to generate a signal from which a harmonic component is removed by applying low-pass filtering to the down-converted signal using convolution in a time domain.

22. A communication method using wireless power, the method comprising:
  determining whether a mutual resonance occurs between a target resonator and a source resonator in a symbol duration;
  modulating data based on whether the mutual resonance occurs;
  charging an inductor and a capacitor, by using power through the mutual resonance;
  delivering power stored in the capacitor to a load; and
  controlling a switch that connects the capacitor to the charger or to the power delivering unit, based on a determination of the controller,
  wherein the target resonator includes the inductor and the capacitor.

23. A communication method using wireless power, the method comprising:
  receiving data from a target resonator through a mutual resonance between a source resonator and the target resonator;
  demodulating the data in a symbol duration based on an amount of power stored in the source resonator;
  charging the source resonator, by using power provided from a power supply device;
  controlling the amount of power stored in the source resonator; and
  modulating data based on the amount of power.

24. The communication device of claim 1, wherein the controller is further configured to change a resonant frequency of the target resonator in the symbol duration.

25. The communication device of claim 1, wherein the symbol duration is a period of time used for transmitting a bit of data information.

26. The communication device of claim 1, wherein the controller is further configured to control the target resonator and the source resonator to mutually resonate within a predetermined symbol duration.

* * * * *